United States Patent [19]

Pinard

[11] Patent Number: 5,423,065
[45] Date of Patent: Jun. 6, 1995

[54] MOBILE WIRELESS COMMUNICATIONS SYSTEM

[75] Inventor: Deborah Pinard, Kanata, Canada

[73] Assignee: Mitel Corporation, Kanata, Canada

[21] Appl. No.: 21,862

[22] Filed: Feb. 24, 1993

[30] Foreign Application Priority Data

Feb. 28, 1992 [CA] Canada .................................. 2062040

[51] Int. Cl.⁶ .............................................. H04Q 7/02
[52] U.S. Cl. .................................. 455/33.2; 455/56.1; 379/60
[58] Field of Search ................ 455/51.1, 53.1, 56.1, 455/33.2, 33.4, 54.2; 379/59, 60

[56] References Cited

U.S. PATENT DOCUMENTS

| | | | |
|---|---|---|---|
| 4,759,051 | 7/1988 | Han | 379/59 |
| 5,117,502 | 5/1992 | Onoda et al. | 455/33.1 |
| 5,203,010 | 4/1993 | Felix et al. | 455/33.2 |
| 5,222,249 | 6/1993 | Carney | 455/33.2 |

*Primary Examiner*—Reinhard J. Eisenzopf
*Assistant Examiner*—Mary M. Lin
*Attorney, Agent, or Firm*—Marks & Clerk

[57] ABSTRACT

A mobile wireless communications system, comprises a plurality of base stations with associated respective coverage zones, each base station being connected to a central host computer and being capable of establishing two-way communication with mobile units in its associated coverage zone and a switch having a plurality of line interfaces connected to the base station. The host computer can select one of the base stations in range of an active mobile unit to establish a call therewith, determine the line interface associated with the call, determine when a hand off from one base station to the next is to occur as the active mobile unit moves between coverage zones, send a hand off message to the switch identifying the current active line interface and the target line interface after hand off associated with the call, and initiate a hand off by sending a call originate message to the next base station instructing it to originate the call on the target line interface. The switch comprises a first memory for storing call data records containing channel assignment and line interface data for each call, a second memory for storing data received from the host computer identifying the target line interface with an imminent hand off from the active line interface associated with the call, and an arrangement for assigning a channel associated with the active line interface to the target line interface on receipt of a call origination signal on the target line interface. In this way, a hand off can take place simply by writing the new line interface data into the existing call data record.

5 Claims, 1 Drawing Sheet

MOBILE WIRELESS COMMUNICATIONS SYSTEM

BACKGROUND OF THE INVENTION

The invention relates to a mobile wireless communications system.

Cellular technology has now become established as the preferred method of providing a multi-user two-way wireless communications system. In a cellular system, a coverage area is divided into a plurality of zones or cells, each associated with its own base station of relatively low power. These zones are designed to be contiguous so that a mobile unit will always be within range of at least one base station in the coverage area. As the mobile area moves between cells, a central computer switches base stations in accordance with signal strength.

In a conventional cellular system, the switching from one base station to the next or "hand off", is accomplished using conference circuitry. This results in a complex architecture because new called data records and channel assignments have to be established at hand off.

SUMMARY OF THE INVENTION

According to the present invention there provided a mobile wireless communications system, comprising a plurality of base stations with associated respective coverage zones, each base station being connected to a central host computer and being capable of establishing two-way communication with mobile units in its associated coverage zone, and a switch having a plurality of line interfaces connected to said base station; said host computer comprising means for selecting one of said base stations in range of an active mobile unit to establish a call therewith, means for determining the line interface associated with the call, means for determining when a hand off from one base station to the next is to occur as the active mobile unit moves between coverage zones, means for sending a hand off message to said switch identifying the current active line interface and the target line interface after hand off associated with the call, and means for initiating hand off by sending a call originate message to the next base station instructing it to originate the call on the target line interface; and said switch comprising first memory means for storing call data records containing channel assignment and line interface data for each call, second memory means for storing data received from the host computer identifying the target line interface with an imminent hand off from the active line interface associated with the call, and means for assigning a channel associated with the active line interface to the target line interface on receipt of a call origination signal on the target line interface.

By storing the line interface data in the switch prior to hand off all that is necessary on receipt of a call origination signal on the target interface is for the switch to check the hand off register and find the call data record for the current line interface. The switch can then release the current line interface and overwrite the call data record with the target line interface information. There is no need to create a new call data record associated with the new line interface circuit.

The first memory means are preferably dynamic hardware registers.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
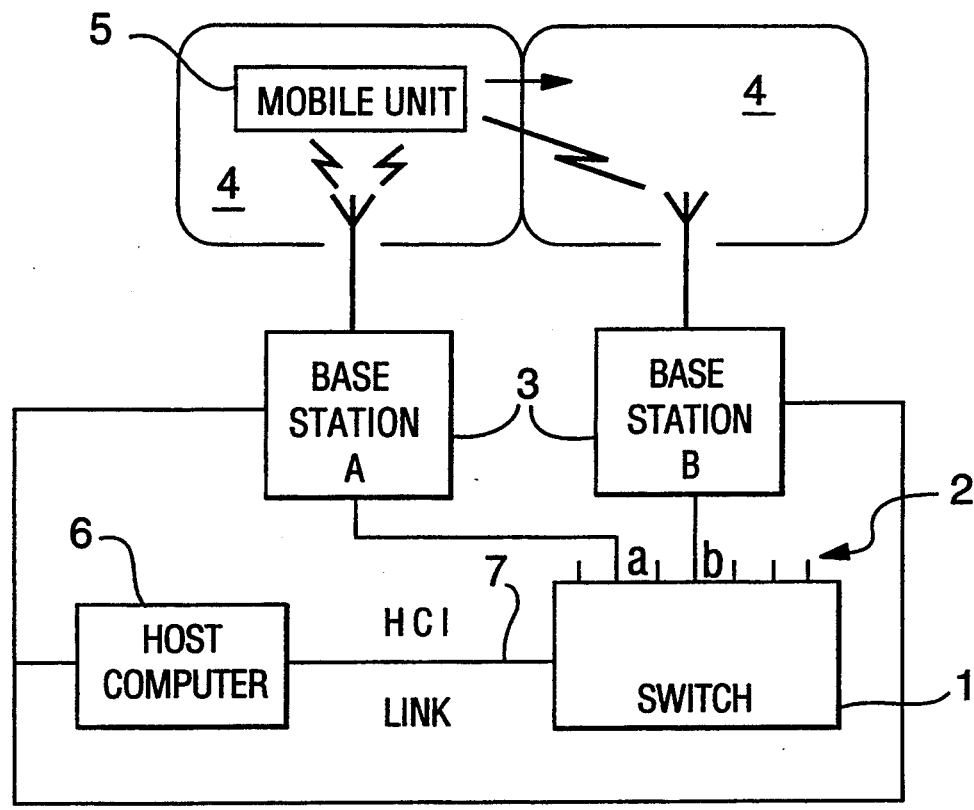
FIG. 1 is block diagram of a mobile wireless communications system in accordance with the invention.

Referring now to FIG. 1, the mobile wireless communication system comprises a switch 1 connected through a plurality of line interfaces 2 to a plurality of base stations 3. Each base station 3 can be connected to any of the line interfaces 2, but in FIG. 1 base station A is shown connected to line interface a and base station B connected to line interface b.

Each base station 3 is associated with a coverage zone of cell 4 and is capable of establishing two-way wireless communication with mobile units 5 in its associated zone 4.

The base stations 3 are also connected to a host computer 6, which is connected through an HCI link 7 to the switch 1. The host computer 6 controls the operation of the system.

Figure 2:
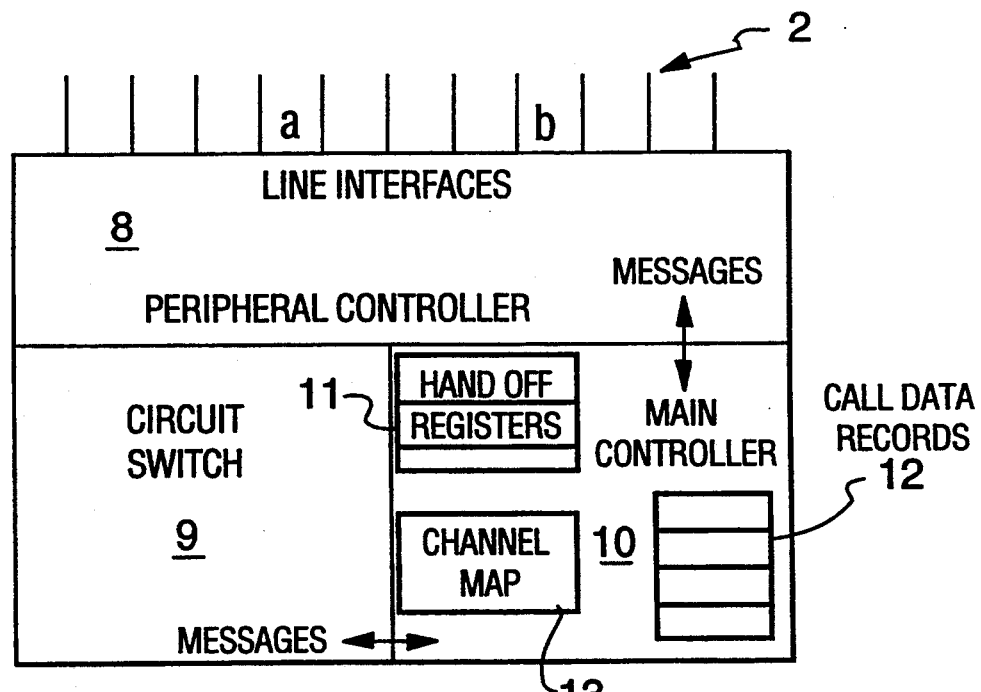
FIG. 2 is a more detailed block diagram of the switch forming part of the system shown in FIG. 1.

The switch 1 is shown in more detail in FIG. 2. It comprises a peripheral controller 8 containing the line interfaces 2, a circuit switch circuit 9, and a main controller 10 which includes the hand off register 11, the call data record registers 12, and the channel map 13. The call data record registers 12 are dynamic hardware registers. When a call is originated a call data record is established in a register 12. This stores information pertaining to the line interface unit and channel assignments in the circuit switch 9.

The switch preferably employs the architecture of Mitel GX 5000 switch. The line interface units are managed by the peripheral controller 8, and the switch path connections, or channels, are connected using the circuit switch 9. The main controller 10 handles all the call processing and communicates with the peripheral and circuit switch using messages as shown. When the line circuit 2 originates a call, the peripheral controller 8 sends a message to the main controller 10, which creates the call data record, sets up the channels, and sends a positive acknowledged signal to the peripheral unit 8. The peripheral unit 8 then connects the channels to the circuit switch from the line interface 2.

In operation, the system operates as follows:

When a call is first originated, for example by mobile unit 5, the host computer 6 determines which base station 3 is receiving the strongest signal and designates that base station to establish the call. The host computer 6 identifies a free line interface 2 in the switch 1 and sends a message to the designated base station 3 to originate a call to that line interface. The destination digits are buffered by the peripheral 8 and sent to the main controller 10, which translates the digits into a destination address and sends the message to the destination circuit via the peripheral unit 8 to cease the destination line interface unit. Included in this message are channels that connect up to the circuit switch 9. When the destination line interface has been successfully ceased, a positive acknowledge signal is sent to the main controller. When the terminating unit answers the call, the main controller is informed with a message, and the originating device channels are connected to the terminating device channels.

After call origination, channel assignments are established in accordance with the call routing requirements and recorded in a call data record stored in register 12 along with the identification of the active line interface. Main controller 10 of the switch 1 sends message to the circuit switch to set up circuits in accordance with the required channel assignments stored in the associated call data record. In this architecture, the call records are merely required to have pointers to each other in order to set up the calls.

During progress of the call, the host computer 6 monitors signal strength, and as the mobile unit 5 moves into an adjacent zone 4 determines that a hand off is about to take place. When this occurs, the host computer 6 sends an HCI message to the switch 1 informing it of the imminent hand off. Included in the message is data identifying the active line interface for the call a, along with a new target line interface b.

On receipt of this message from the host computer 6, the controller 10 stores the data in a hand off register 11 associated with the active line interface. Each line interface 2 is associated with its own hand off register 11.

After sending the imminent hand off message to the switch 1, the host computer 6 determines that hand off should occur and sends a message to base station 3B instructing it to originate a call on line interface b in the switch 1. Call origination is noted by the main controller 10, which first checks the hand off register associated with the line interface b. If there is an imminent hand off for that interface, the main controller 10 reads the identity of the handing off line interface a from the hand off register 11, which in this case is line interface a, finds the call data record for line interface a, releases line interface a, and then simply overwrites the line interface data on the call data record with line interface b's identity. The already assigned channels are then connected to the new line interface b. In this scheme, the only change occurring during hand off from line interface a to line interface b is the change in line interface information stored in the call data record register. This considerably simplifies the implementation of the system architecture relative to the prior art.

It will thus be seen that when line interface b originates a call, and there is a hand off imminent, instead of having to set up its own call data record and channels, the target line interface b can use the call data record already in use by line interface a and update it with its own information. The positive acknowledgement can be sent to the line interface using existing channels. No updating of the active features is required since the same call data record is employed.

The described device thus has considerable advantages in terms of simplicity and system architecture over the prior art.

I claim:

1. A mobile wireless communications system, comprising a plurality of base stations with associated respective coverage zones, each base station being connected to a central host computer and being capable of establishing two-way communication with mobile units in its associated coverage zone, and a switch having a plurality of line interfaces connected to said base station; said host computer comprising means for selecting one of said base stations in range of an active mobile unit to establish a call therewith, means for determining the line interface associated with the call, means for determining when a hand off from one base station to the next is to occur as the active mobile unit moves between coverage zones, means for sending a hand off message to said switch identifying the current active line interface and the target line interface after hand off associated with the call, and means for initiating hand off by sending a call originate message to the next base station instructing it to originate the call on the target line interface; and said switch comprising first memory means for storing call data records containing channel assignment and line interface data for each call, second memory means for storing data received from the host computer identifying the target line interface with an imminent hand off from the active line interface associated with the call, and means for assigning a channel associated with the active line interface to the target line interface on receipt of a call origination signal on the target line interface.

2. A mobile wireless communications system as claimed in Claim 1, wherein on receipt of the call origination signal on the target line interface the active line interface data in the channel data record associated with the call is overwritten with the target line interface data.

3. A mobile wireless communications system as claimed in claim 1, wherein said first memory means comprises dynamic hardware registers.

4. A mobile wireless communications system as claimed in claim 1, wherein said switch comprises a switching circuit for establishing connections between designated channels; a peripheral controller containing said line interfaces; and a main controller comprising said first and second memory means, a further memory means defining a channel map, and means for sending messages to and receiving messages from said switching circuit and said peripheral unit to control the operation thereof.

5. A mobile wireless communications system as claimed in claim 1, wherein said host computer is connected to said switch over a Host Computer Interface (HCI) link.

* * * * *